March 30, 1937.   G. E. ROWE   2,075,752
LEHR STACKER
Filed Oct. 26, 1934
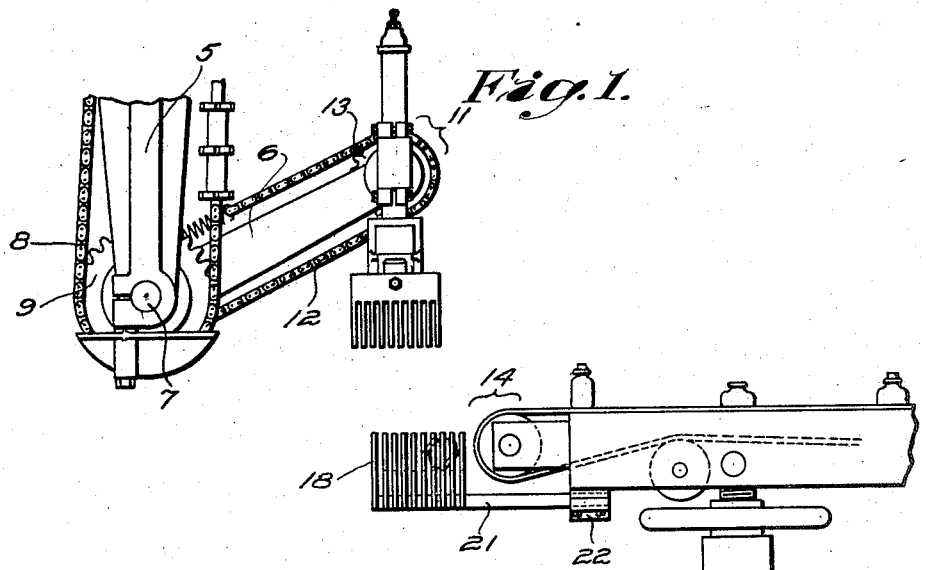
Fig. 1.
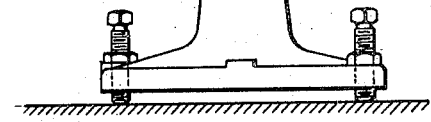
Fig. 2.
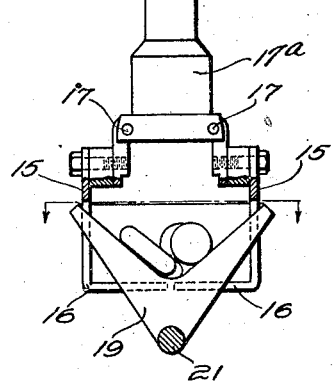
Fig. 3.
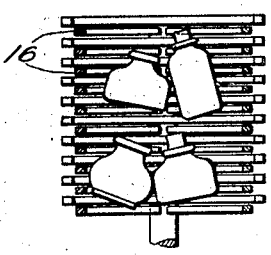
Fig. 4.
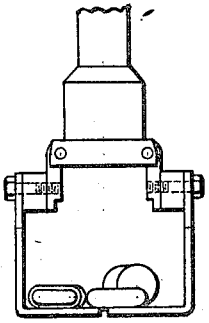
Witness;
W. B. Shayer.
Inventor;
George E. Rowe
by Brown & Parham
Attorneys Patented Mar. 30, 1937

2,075,752

UNITED STATES PATENT OFFICE 2,075,752

LEHR STACKER

George E. Rowe, Wethersfield, Conn., assignor to Hartford-Empire Company, Hartford, Conn., a corporation of Delaware Application October 26, 1934, Serial No. 750,120

7 Claims. (Cl. 214—1)

This invention relates to lehr stackers for delivering glassware to lehrs for annealing and has particular relation to stackers of the type embodying tongs for removing the ware from a conveyor and placing the same at intervals on the lehr belt.

Heretofore, stackers of the above-mentioned type usually have been provided with tongs for gripping the necks of the articles and for transferring the ware while suspended from the tongs. While this is desirable in the handling of such articles as are to be placed on the lehr belt on their bottoms, and particularly where the bottles are all of the same kind, it is not always suitable for stacking ware with narrow bottoms, small articles or miscellaneous articles. The use of such neck-gripping tongs requires accurate spotting of the ware and this limits the number and kinds of articles which can be transferred to the lehr belt in one operation.

The general object of the present invention is to provide a lehr stacker equipped with novel means for transferring narrow bottomed, small and/or miscellaneous articles.

A more specific object of the invention is to provide a lehr stacker which instead of having the usual neck-gripping tongs, is provided with novel means for gathering up a plurality of articles promiscuously and placing them on the belt of a lehr for annealing, thus avoiding the necessity of accurately spotting the ware for the pick-up, and increasing the capacity of the stacker for the transfer of glassware.

Another object of the invention is to provide a lehr stacker having tongs adapted to intermesh with the blades of a glassware receptacle to remove simultaneously a plurality of articles from the receptacle.

Further objects of the invention will be pointed out in, or will become apparent from, the following description of an embodiment of the invention shown in the accompanying drawing, in which drawing:

Figure 1 is a view in side elevation of a portion of a lehr stacker and conveyor embodying the invention;

Fig. 2 is an enlarged view in sectional elevation of the tongs and receptacle in cooperative ware transferring relation;

Fig. 3 is a view in horizontal section taken on the line 3—3 of Fig. 2, and

Fig. 4 is a view similar to Fig. 2 showing the stacker tongs supporting a plurality of articles after removal thereof from the receptacle.

Referring in detail to the drawing, 5 indicates the vertically depending bracket of a lehr stacker carried by the oscillating carriage (not shown) of the well-known Hartford lehr stacker which is completely illustrated and described in the patent of E. H. Lorenz No. 1,878,156, granted September 20, 1932. This arm 5 carries the transfer arm 6 pivoted on stud 7 for vertical oscillation to swing the arm from the ware pick-up position to the ware delivery position. Such oscillation is effected by mechanism (not shown) which drives chain 8 on chain gear 9 secured to the hub of transfer arm 6.

Carried on the outer end of arm 6, and journaled therein is the tongs mechanism indicated generally at 11, and which is held in vertical position at all times by chain 12 which surrounds gear 13 fast on the hub of the tongs mechanism, and a gear (not shown) fixed in stationary position on stud 7.

The Hartford lehr stacker embodies two sets of the mechanism such as has been described above, that is, it comprises two transfer arms each having a tongs mechanism, which alternately transfer the glassware.

The description and illustration of but one set of such mechanism is, however, sufficient for the understanding of the present invention which is especially concerned with the tongs members and the receptacle from which it removes the ware.

As above stated, stacker tongs heretofore employed usually grip the ware by the neck to transfer it from the conveyor, such as shown at 14, to the lehr (not shown). To adapt the stacker for the uses above mentioned, this invention provides rigid bent tongs members 15—15 in the shape of right angles, each of which is slotted to form fingers 16—16 uniformly spaced and which, as shown in Figs. 2 and 4, nearly meet at their ends when the tongs are closed and thus form a basket for receiving glassware.

The tongs members 15—15 are pivoted at 17—17 on the barrel 17a of the tongs mechanism and containing an air motor and spring (not shown), such as are provided in the Hartford lehr stacker of the above-mentioned patent, for opening and closing the tongs.

The tongs members 15—15 remove the glassware from a basket or receptacle indicated generally at 18 and which comprises a number of vertical V-shaped blades 19 mounted in uniformly spaced relation on rod 21 to form a receptacle for the glassware. These blades may correspond in number to the number of fingers 16—16 on the tongs members 15—15 and the fingers and blades are of such size and arrangement as to permit the fingers to be closed in interdigital relation to the blades as illustrated in Figs. 2 and 3.

The basket or receptacle may be mounted at the end of, and slightly below the ware-bearing strand of the conveyor, by rod 21 which may be of sufficient length to be received in a bracket 22 on the conveyor. It will be observed from Figs. 1 and 2 that the sides of the V-shaped blades 19 provide a space of appreciable depth for holding or containing the articles which are delivered thereto by the conveyor 14. The receptacle 18 being slightly below the level of the conveyor, as described, the articles tip over and fall lengthwise into the receptacle 18 and are prevented from escape from the receptacle by the edges of the blades and by the upward inclination of the sides of the blades, as will be understood.

In the operation of the invention, the tongs are lowered and closed about and beneath the articles of glassware which previously have been delivered to the receptacle or basket by the conveyor. The tongs are then raised to remove the ware from the basket or receptacle as illustrated in Fig. 4 and to carry them to the point of delivery on the lehr belt (not shown) where the tongs are opened to release the articles in a group on said belt.

As in the stacker of said Patent No. 1,878,156, the frame carrying the arms 5 is suitably indexed between movements of the arms so that the ware is deposited on different areas of the lehr conveyor on successive operations of the stacker arms.

This invention thus provides simple but efficient means of novel character for adapting a lehr stacker to the transfer of a group of articles at one time, while making unnecessary accurate spotting of the ware at the pick-up point. Thus, a substantial increase in the rate of transfer of glass articles is obtained. The term "lehr stacker" is used in the claims in the same sense as such term is commonly used in the glass industry; that is, to specify a fully automatic machine for picking up articles of glassware and for delivering such articles to the belt of a lehr in which the glassware is to be annealed.

Having described my invention, what I desire to claim and secure by Letters Patent is:

1. In combination with a receptacle for receiving articles of glassware from a conveyor, and a lehr stacker comprising an oscillating arm having tongs members carried thereby, said receptacle and said tongs members being constructed and arranged for the closing of the tongs in interdigital relation with the receptacle, and for the removal of articles of glassware from said receptacle by said tongs, and means for oscillating said arm to move said tongs members toward and away from said receptacle.

2. In a combination a lehr stacker comprising an oscillating arm having tongs members carried thereby each of which includes a plurality of fingers, a receptacle for receiving articles of glassware from a conveyor, said receptacle comprising a plurality of blades spaced and arranged for the insertion therebetween of the fingers of said tongs members and for the removal of said articles therefrom by said tongs, and means for oscillating said arm to move said tongs members toward and away from said receptacle.

3. In combination with a lehr stacker, a receptacle positioned for the discharge thereto of articles of glassware by a conveyor, said receptacle comprising a plurality of vertical V-shaped blades mounted in uniformly spaced relation, said stacker comprising tongs members each of which has a plurality of vertical uniformly spaced fingers, whereby the tongs members can be closed around and beneath articles of glassware resting in said receptacle in interdigital relation with the blades of said receptacle.

4. Apparatus for transferring glassware, comprising a lehr stacker, said stacker including a pair of rigid tongs members pivoted so closely and so shaped as to swing freely about and close beneath a plurality of articles of glassware with their ends close enough to form a basket-like carrier for said articles.

5. Apparatus for transferring glassware, comprising a lehr stacker, said stacker including a pair of rigid tongs members pivoted so closely and so shaped as to swing freely about and close beneath a plurality of articles of glassware with their ends close enough to form a basket-like carrier for said articles, each of said members comprising a plurality of spaced parallel fingers, and means for holding said articles in position to be transferred by said stacker comprising a plurality of spaced parallel parts arranged so that the tongs members might close about and remove said articles without obstruction.

6. Apparatus for transferring glassware, comprising a lehr stacker, said stacker embodying an oscillating arm, a barrel pivoted on said arm, means for holding said barrel in a permanently upright position, tongs members pivoted on said barrel, each of said members comprising a plurality of spaced parallel fingers adapted to close about and beneath a plurality of articles of glassware, and means constructed and arranged to support and hold said articles for the unobstructed closing of said tongs members and removal of said articles.

7. Apparatus for delivering glassware to a lehr comprising a lehr stacker having a pair of rigid tongs members pivoted thereon, said members being bent inwardly toward each other, and pivoted so closely that their ends adjoin when in closed position, and being formed respectively into a plurality of spaced parallel fingers whereby mere swinging together of said members forms a basket-like carrier for glassware, and a receptacle for containing a plurality of articles of glassware, said receptacle being formed by a plurality of parallel parts so shaped as to confine the articles of glassware in said receptacle and adapted for the closing of the tongs members about said articles and the removal thereof from the receptacle without obstruction.

GEORGE E. ROWE.